(12) United States Patent
Hörlin et al.

(10) Patent No.: US 6,993,018 B1
(45) Date of Patent: Jan. 31, 2006

(54) PRIORITY SIGNALING FOR CELL SWITCHING

(75) Inventors: Dan Hörlin, Enskede (SE); Lars-Göran Petersen, Tumba (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 592 days.

(21) Appl. No.: 09/712,123

(22) Filed: Nov. 15, 2000

Related U.S. Application Data (63) Continuation-in-part of application No. 09/365,826, filed on Aug. 3, 1999, now abandoned.

(51) Int. Cl.
*H04Q 1/00* (2006.01)

(52) U.S. Cl. ...................................... 370/382; 370/412

(58) Field of Classification Search ................ 370/412, 370/413–414, 415, 232, 235, 416, 417, 418, 370/428, 429, 422, 455, 395.42; 710/52, 710/53

See application file for complete search history.

(56) References Cited

U.S. PATENT DOCUMENTS

| | | | |
|---|---|---|---|
| 5,126,999 A * | 6/1992 | Munter et al. ............... | 370/415 |
| 5,189,666 A * | 2/1993 | Kagawa .................. | 370/395.31 |
| 5,390,176 A * | 2/1995 | Schoute et al. .......... | 370/395.7 |
| 5,475,383 A * | 12/1995 | Ohta et al. .................. | 370/382 |
| 5,487,061 A | 1/1996 | Bray | |
| 5,493,566 A | 2/1996 | Ljungberg et al. | |
| 5,499,238 A | 3/1996 | Shon | |
| 5,509,008 A * | 4/1996 | Genda et al. ............... | 370/398 |
| 5,537,400 A | 7/1996 | Diaz et al. | |
| 5,550,823 A | 8/1996 | Irie et al. | |
| 5,581,544 A | 12/1996 | Hamada et al. | |
| 5,619,500 A | 4/1997 | Hiekali | |
| 5,721,833 A | 2/1998 | Cooperman et al. | |
| 5,745,489 A * | 4/1998 | Diaz et al. ............... | 370/395.7 |
| 5,757,771 A | 5/1998 | Li et al. | |
| 5,768,257 A | 6/1998 | Khacherian et al. | |

(Continued)

FOREIGN PATENT DOCUMENTS

WO            00/38380        6/2000

OTHER PUBLICATIONS

Mirfakhraei, "Wafer-Scale Integration as a Technology Choice for High Speed ATM Switching Systems", Proceedings of the Annual International Conference on Wafer Scale Integration (from 1996 Proceedings of th Int'l. Conference on Innovative Systems in Silicon), US, New York, IEEE, vol. CONF. 6, 1994, pp. 282-291.

Dol et al, "A High-Speed ATM Switch Architecture for FTTH—An ATM Switch Architecture Iwth Input and Cross-Point Buffers", Proceedings of the International Switching Symposium, DE, Berlin, VDE Verlag, vol. SYMP, 15, Apr. 23, 1995, pp. 384-388.

Written Opinion mailed Jul. 26, 2002 in corresponding PCT application No. PCT/SE01/02392.

*Primary Examiner*—Hassan Kizou
*Assistant Examiner*—Ricardo Pizarro
(74) *Attorney, Agent, or Firm*—Nixon & Vanderhye, P.C.

(57) ABSTRACT

A switching node (20) has a semiconductor switch core (22) and plural switch port devices (24). The semiconductor switch core comprises a two dimensional buffer matrix having one buffer memory (40) per crosspoint to which cells having differing priority classes are written. The switch core further has plural switch core ports (30), with each of the switch core ports writing traffic cells to a row (42) of the matrix and reading traffic cells from a column (44) of the matrix. For each crosspoint of the matrix a high priority signaling element (46H) is formed in the semiconductor switch core. A novel low priority cell flushing operation the present invention moots any cell blocking problems.

25 Claims, 10 Drawing Sheets

U.S. PATENT DOCUMENTS

| | | |
|---|---|---|
| 5,790,522 A | 8/1998 | Fichou et al. |
| 5,805,589 A * | 9/1998 | Hochschild et al. ........ 370/389 |
| 5,828,653 A | 10/1998 | Goss |
| 5,862,128 A | 1/1999 | Cooperman et al. |
| 5,914,934 A | 6/1999 | Rathnavelu |
| 6,151,301 A * | 11/2000 | Holden ....................... 370/232 |
| 6,483,831 B1 * | 11/2002 | Petersen ..................... 370/380 |
| 6,507,584 B1 * | 1/2003 | Moriwaki et al. .......... 370/398 |
| 6,556,571 B1 * | 4/2003 | Shahrier et al. ......... 370/395.4 |
| 6,606,326 B1 * | 8/2003 | Herring ...................... 370/412 |

* cited by examiner

PRIORITY SIGNALING FOR CELL SWITCHING

This application is a continuation-in-part of U.S. patent application Ser. No. 09/365,826, filed Aug. 3, 1999, now abandoned, entitled "CONNECTION ADMISSION CONTROL BASED ON BANDWIDTH AND BUFFER USAGE", the entire contents of which are incorporated herein by reference.

BACKGROUND

1. Field of the Invention

The present invention pertains to switching of cells or packets through a switching device such as a node of a telecommunications network, and particularly to the switching of cells/packets having different classes of priorities or quality of service.

2. Related Art and Other Considerations

It is common in telecommunications and other fields to route cells or packets, such as (for example) ATM (Asynchronous Transfer Mode) cells, between nodes of a network. To accomplish the routing, one or more of the nodes through which the cells travel may include a switching device. Typically such a switching device includes a switch core which has plural switch core ports. In some switch core configurations, the switch core is formed as a buffer matrix with a crosspoint occurring at each row/column intersection of buffers. In such configuration, generally a switch core port writes cells to buffers in an associated row of the buffer matrix, and reads out cells from an associated column of the buffer matrix. Often a switch core interface board or the like interconnects a switch core port with network lines external to the node.

Various aspects of an example switch core for ATM-based telecommunications are explained in the following: U.S. patent application Ser. No. 09/188,101 [PCT/SE98/02325] and Ser. No. 09/188,265 [PCT/SE98/02326] entitled "Asynchronous Transfer Mode Switch"; U.S. patent application Ser. No. 09/188,102 [PCT/SE98/02249] entitled "Asynchronous Transfer Mode System", all of which are incorporated herein by reference.

Cell switching nodes commonly handle cells of differing priority classes, e.g., cells having differing quality of service (QoS) designations. In a telecommunications context, for example, the cells belonging to very delay sensitive connections are labeled as being of a high priority, while cells belonging to less delay sensitive connections are labeled as being of a lower priority. The cell switching nodes usually handle high priority and low priority cells essentially concurrently.

To facilitate such concurrent handling of cells of differing priority, conventionally each crosspoint of the switch core's buffer matrix plural buffers has plural buffers (e.g., plural memory elements), usually one for each possible priority class or quality of service class. Incoming cells to the node are, upon receipt, typically queued in the switch core interface board, usually in a queue associated with the priority class of the cell. For example, incoming high priority cells are queued in a high priority queue of the switch core interface board, while incoming low priority cells are queued in a low priority queue of the switch core interface board. When it is determined to which crosspoint of the buffer matrix a queued high priority cell is to be written, the high priority cells is written into the buffer of the crosspoint that is allocated for high priority cells. Queued lower priority cells for the same crosspoint, on the other hand, are written to another buffer(s) of the crosspoint. Thus, the switch core is, in a sense, three dimensional, with a first dimension comprising rows of the matrix; a second dimension comprising columns of the matrix; and a third dimension comprising the various plural buffer memories for each of the corresponding plural priority classes.

Thus, in some conventional switch cores implemented in hardware, each priority class (e.g., quality of service (QoS) class) uses separate buffers. The plural buffers at each crosspoint feed the same switch core port for cell readout purposes, with the order of read out being based on the priority class of the buffers.

The number of buffers required for the switch core described above is thus the square of the number of switch core ports, multiplied by the number of priority classes handled by the switch core. This results in large memory requirements. When the switch core is fabricated using semiconductor memory, the large memory requirements involve a large silicon area.

What is needed therefore, and an object of the present invention, is a semiconductor switch core that economically handles cells of plural priority classes.

BRIEF SUMMARY OF THE INVENTION

A switching node has a semiconductor switch core and plural switch port devices. The semiconductor switch core comprises a two dimensional buffer matrix having one buffer memory per crosspoint to which cells having differing priority classes are written. The switch core further has plural switch core ports, with each of the switch core ports writing traffic cells to a row of the matrix and reading traffic cells from a column of the matrix. For each crosspoint of the matrix a high priority signaling element is formed in the semiconductor switch core.

A novel low priority cell flushing operation the present invention moots any cell blocking problems. In accordance with the low priority cell flushing operation of the present invention, a high priority signaling element is activated when a high priority cell is in the queue for high priority cells awaiting writing to a particular buffer memory. In response to the activation of the high priority signaling element, a read device associated with appropriate the switch core port reads out any low priority cell that resides in that particular buffer memory. The low priority cell read out in this manner is transmitted via the switch core port to the switch port device for eventual transmission out of the switching node (and thus is not discarded). Thus, the potentially blocking low priority cell is essentially treated as a high priority cell for purposes of flushing the buffer memory to which the high priority cell should be written. The high priority cell can then be written by write device into the now-vacant buffer memory. While the high priority cell is in the buffer memory, the high priority signaling element is activated, demanding attention and thus immediate readout by the read device. The high priority cell can then be promptly read out and transmitted via the switch core port to the switch port device for transmission out of the switching node. Thus, the potential blocking low priority cell is immediately flushed through the switch core to facilitate prompt routing of the high priority cell.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
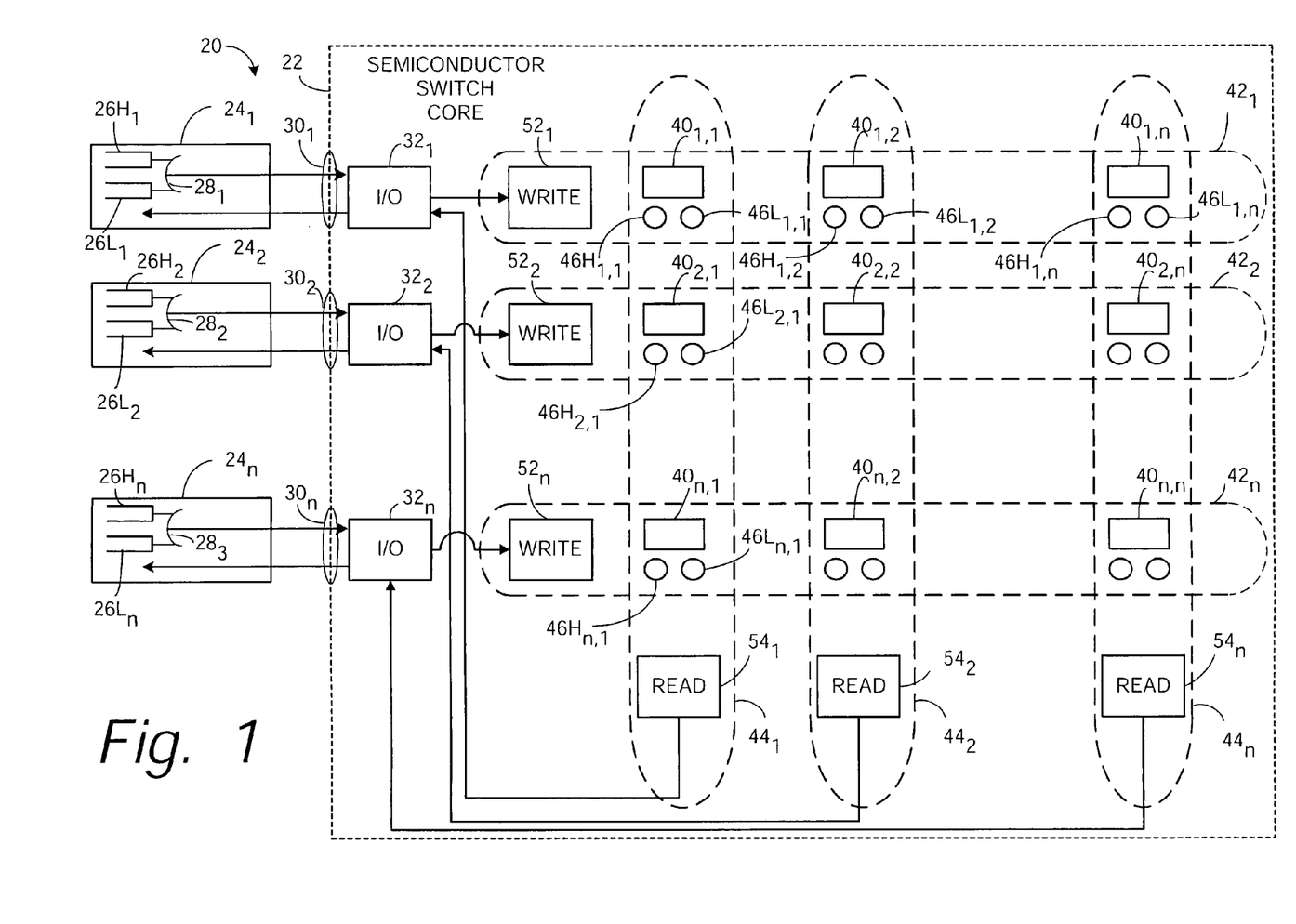
FIG. 1 is a schematic view of a switching node according to an illustrative, non-limiting embodiment of the invention.

FIG. 1 shows an illustrative, non-limiting implementation of a switching node 20 according to one embodiment of the invention. The switching node 20 includes a semiconductor switch core 22 and plural switch port devices, such as switch port devices $24_1$ through $24_n$ shown in FIG. 1. Each switch port device 24 is connected to one or more input links and one or more output links, the input and output links serving to carry cells or packets to/from the switching node 20 to external locations, e.g., to other nodes of a network which encompasses switching node 20.

The switch core 22 essentially serves to route or switch cells or packets through switching node 20, so that a cell or packet received on an input link at a first of the switch port devices 24 can be directed away from switching node 20 on an output link connected to one of the switch port devices 24. The switching node 20 can, in differing embodiments, handle either cells (e.g., ATM cells) or other types of packets of various lengths. For sake of simplicity, in the ensuing discussion reference is made primarily to the handling (e.g., writing and reading) and routing of cells. However, it should be understood that the invention is not limited to the handling/routing of cells per se, but that the discussion herein applies equally to packets as well. Moreover, unless otherwise indicated or clear from the context, as used herein the term "cell" means a traffic cell (e.g., a cell which, in a telecommunications context, includes connection-related user information in its payload).

On its input link(s), each switch port device 24 typically receives traffic cells having differing priority classifications. Accordingly, on its input side each switch port device 24 includes plural cell-receiving input queues 26, typically one input queue for each priority class. To illustrate a simple case, FIG. 1 shows only two input queues provided for each switch port device 24, i.e., queues 26L and 26H. Queue 26H is a queue for storing high priority cells prior to the writing of the cells to the switch core 22; queue 26L is a queue for storing low priority cells prior to the writing of the cells to the switch core 22. Thus, in the example of FIG. 1 and the scenario hereinafter described, for sake of simplicity only two priority classes are involved—a high priority class and a low priority class. It will readily be apparent that, in addition to the high priority queue 26H, plural lower priority queues can be provided. In each switch port device 24, a selector 28 is employed to select from which queue (e.g., queue 26H or queue 26L) a traffic cell should be extracted for application to switch core 22.

Each switch port device 24 can, and typically does, include further structure which is not necessarily germane to the present invention. Moreover, it will be appreciated that, at least in some embodiments, the switch port devices 24 function to add headers or routing tags to the incoming cells in order to facilitate, e.g., routing of the cells through switch core 22. In addition, each switch port device 24 can also generate certain control or maintenance cells, one example of which pertinent to the present invention will hereinafter be described. Further details regarding illustrative additional structures which can comprise switch port device 24 are understood with resort to the following patent documents as examples: U.S. Pat. No. 6,088,359, entitled "ABR SERVER"; U.S. Pat. No. 5,953,553, entitled "HANDLING ATM MULTICAST CELLS"; U.S. patent application Ser. No. 08/893,576, entitled "A DATA SHAPER FOR ATM TRAFFIC", filed Jul. 11, 1997; U.S. Pat. No. 6,034,958, entitled "VP/VC LOOK-UP FUNCTION", and, U.S. patent application Ser. No. 08/893,391, entitled "VC MERGING", filed Jul. 11, 1997.

The semiconductor switch core 22 includes plural switch core ports 30. When the switching node is fully utilized, the number of switch core ports 30 equals the number of switch port devices 24. Thus, switch core ports $30_1$–$30_n$ are illustrated in FIG. 1. Each switch core port 30 is connected, e.g., by a bidirectional link, to its corresponding switch port device 24. For sake of illustration, FIG. 1 shows an input line to each switch core port 30 from its associated switch port device 24 and an output line from each switch core port 30 to its associated switch port device 24 for depicting the bidirectional flow of cells between the associated switch port device 24 and switch core port 30.

The semiconductor switch core 22 comprises a buffer matrix, e.g., a matrix of buffer memories $40_{r,c}$ arranged in row and column format. In particular, the matrix comprises rows $42_1$ through $42_n$ of buffer memories 40 and columns $44_1$ through $44_n$ of buffer memories 40. The intersection of a row 42 and column 44 is referred to as a crosspoint. As used herein, in the notation "buffer memory $40_{r,c}$" the subscript r refers to the row number, while the subscript c refers to the column number.

In addition, each buffer memory $40_{r,c}$ has associated therewith plural semiconductor signaling elements, such as the two signaling elements $46H_{r,c}$ and $46L_{r,c}$ shown for each buffer memory $40_{r,c}$ in FIG. 1. As explained hereinafter, for each crosspoint signaling element 46H is a high priority signaling element; signaling element 46L is a low priority signaling element. In the illustrated embodiment, two signaling elements 46 are shown per buffer memory $40_{r,c}$, there being two priority classes of traffic cells in the illustrated scenario.

Each switch core port 30 includes input/output (I/O) control logic unit 32 which, among other things, receives control cells from a switch port device 24. The I/O control logic unit 32 also controls the writing of cells to a particular row 42 of the matrix which is associated with the switch core port 30, as well as the reading of cells from a particular column 44 of the matrix which is associated with the switch core port 30. In this regard, each I/O control logic unit 32 has associated therewith a write device 52 and a read device 54. For example, I/O control logic unit $32_1$ uses write device $52_1$ to write traffic cells to the buffer memories 40 in row $42_1$, i.e., to buffer memories $40_{1,1}$, $40_{1,2}$, ... $40_{1,n}$. I/O control logic unit $32_1$ uses read device $54_1$ to read traffic cells from the buffer memories 40 in column 441, i.e., from buffer memories $40_{1,1}$, $40_{2,1}$, ... $40_{n,1}$. Similarly, I/O control logic unit $32_2$ uses write device $52_2$ to write traffic cells to the buffer memories 40 in row $42_2$, and uses read device $54_2$ to read traffic cells from the buffer memories 40 in column $44_2$.

The switch core 22 is thus only a two dimensional matrix. Since there is only one buffer memory 40 per crosspoint, a third dimension is lacking. Not having the necessity of the third dimension, the matrix requires fewer buffer memories 40 and thus advantageously consumes/occupies less silicon for fabrication. But with this two dimensional structure, the one buffer memory 40 per crosspoint must serve traffic cells of all priority classes, e.g., of both the high priority class and the low priority class. Although such a two dimensional structure could present a cell blocking problem, a novel low priority cell flushing operation the present invention moots the cell blocking problem as hereinafter described.

In the above regard, the present invention addresses a problematic situation in which a high priority traffic cell is received into a high priority cell queue 26H of a switch port device 24, but the particularly buffer memory $40_{r,c}$ to which the high priority traffic cell is destined already contains a low priority cell. The high priority cell must be stored in the same buffer memory 40 in which the low priority currently resides, since there is no third dimension of the buffer matrix to cater to traffic cells of differing priority classes. In this situation, the low priority cell in the buffer memory $40_{r,c}$ essentially blocks the immediate routing of the high priority cell through switch core 22. Since the priority of the block cell is low, the low priority cell could (without a low priority cell flushing aspect of the present invention) linger in the buffer memory 40 for a considerable time, exacerbating the blocking of the high priority cell.

In accordance with the low priority cell flushing operation of the present invention, the high priority signaling element $46H_{r,c}$ is activated when a high priority cell is in the queue 26H for high priority cells awaiting writing to the buffer memory $40_{r,c}$. In response to the activation of the high priority signaling element $46H_{r,c}$, the read device $54_c$ associated with the switch core port $30_c$ reads out any low priority cell that resides in the buffer memory $40_{r,c}$. The low priority cell read out in this manner is transmitted via the switch core port $30_c$ to the switch port device $24_c$ for eventual transmission out of the switching node 20 (and thus is not discarded). Thus, the potentially blocking low priority cell is essentially treated as a high priority cell for purposes of flushing the buffer memory to which the high priority cell should be written. The high priority cell can then be written by write device $52_r$ into the now-vacant buffer memory $40_{r,c}$. While the high priority cell is in the buffer memory $40_{r,c}$, the high priority signaling element $46H_{r,c}$ is activated, demanding attention and thus immediate readout by the read device $54_c$. The high priority cell is read out and transmitted via the switch core port $30_c$ to the switch port device $24_c$ for transmission out of the switching node 20. Thus, the potential blocking low priority cell is immediately flushed through the switch core to facilitate prompt routing of the high priority cell.

Figure 2:
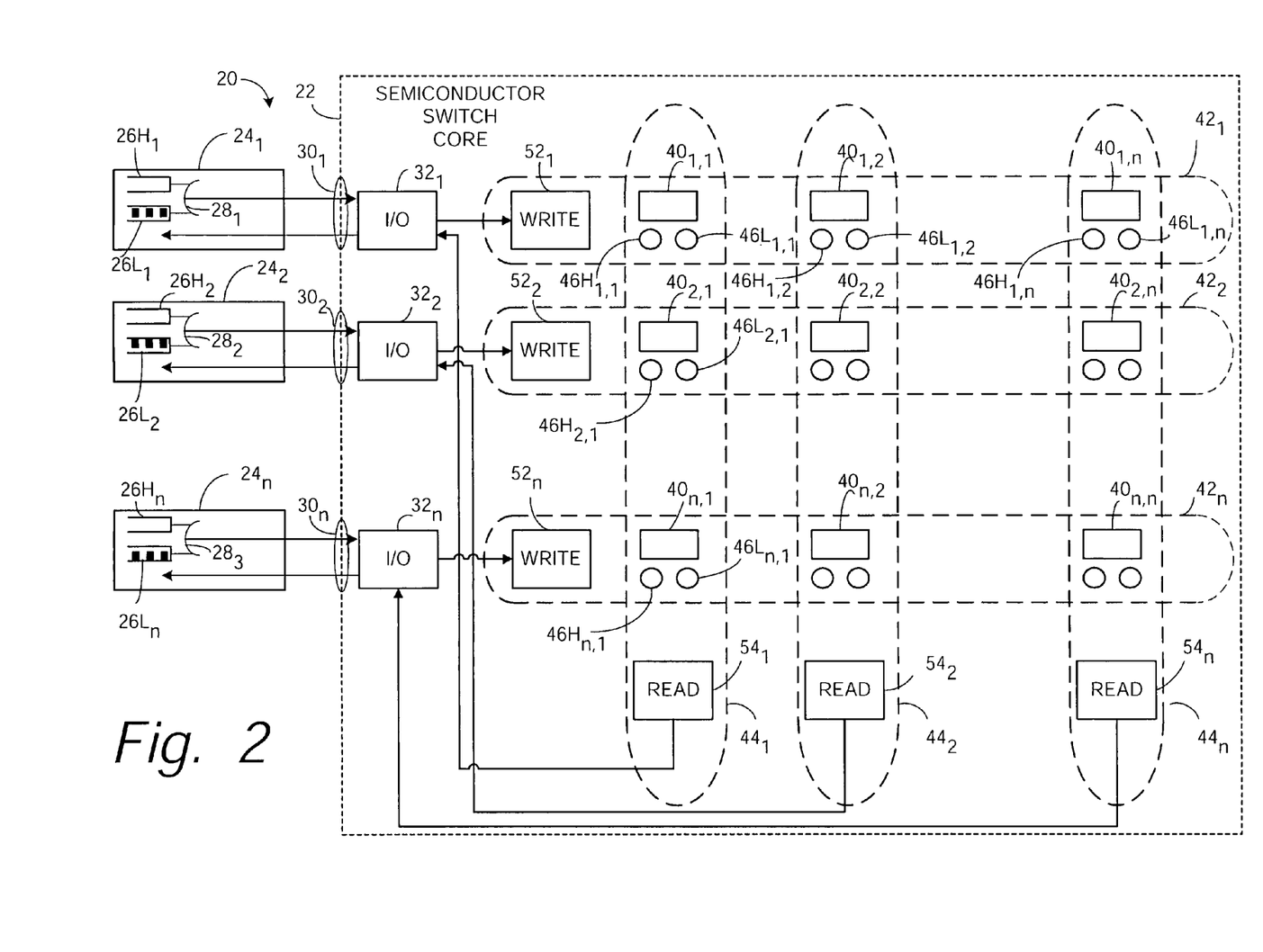
FIG. 2 through FIG. 10 illustrate certain example stages of operation of an example scenario of a low priority cell flush operation of the present invention.

FIG. 2 through FIG. 10 illustrate certain example stages of operation of an example scenario of the low priority cell flush operation of the present invention. FIG. 2 shows an example start condition, in which all switch port devices 24 have low priority cells waiting to be written to switch core 22. In FIG. 2–FIG. 10, a traffic cell is depicted as a shaded rectangle; a control cell is depicted as a hollow rectangle. The low priority cells wait in their queues $26L_1$–$26L_n$ at the respective switch port devices $24_1$–$24_n$. For sake of simplicity, three low priority traffic cells are shown in each of queues $26L_1$–$26L_n$. At the start time shown in FIG. 2, there are no traffic cells in any of the buffer memories 40 of switch core 22. In the illustrated scenario, it will be assumed that all traffic cells received in the switch port devices 24 are to be written into column $44_2$ of the switch core 22.

Figure 3:
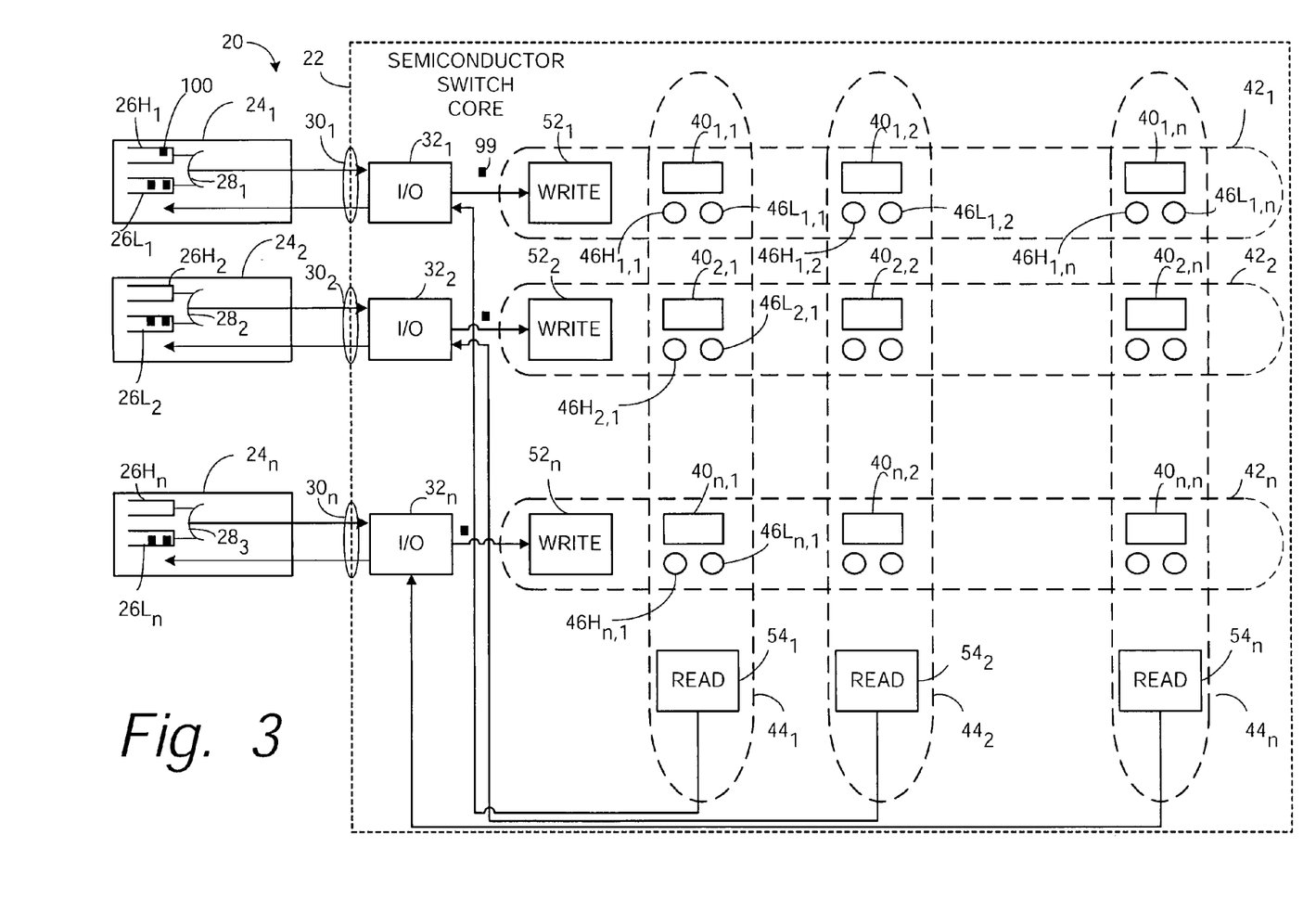

FIG. 3 shows one low priority cell being transmitted from each of the queues $26L_1$–$26L_n$ toward the corresponding write devices $52_1$–$52_n$. Note in particular that a low priority cell 99 is headed toward buffer memory $40_{1,2}$. In addition, FIG. 3 shows that a high priority cell 100 has entered high priority queue $26H_1$.

Figure 4:
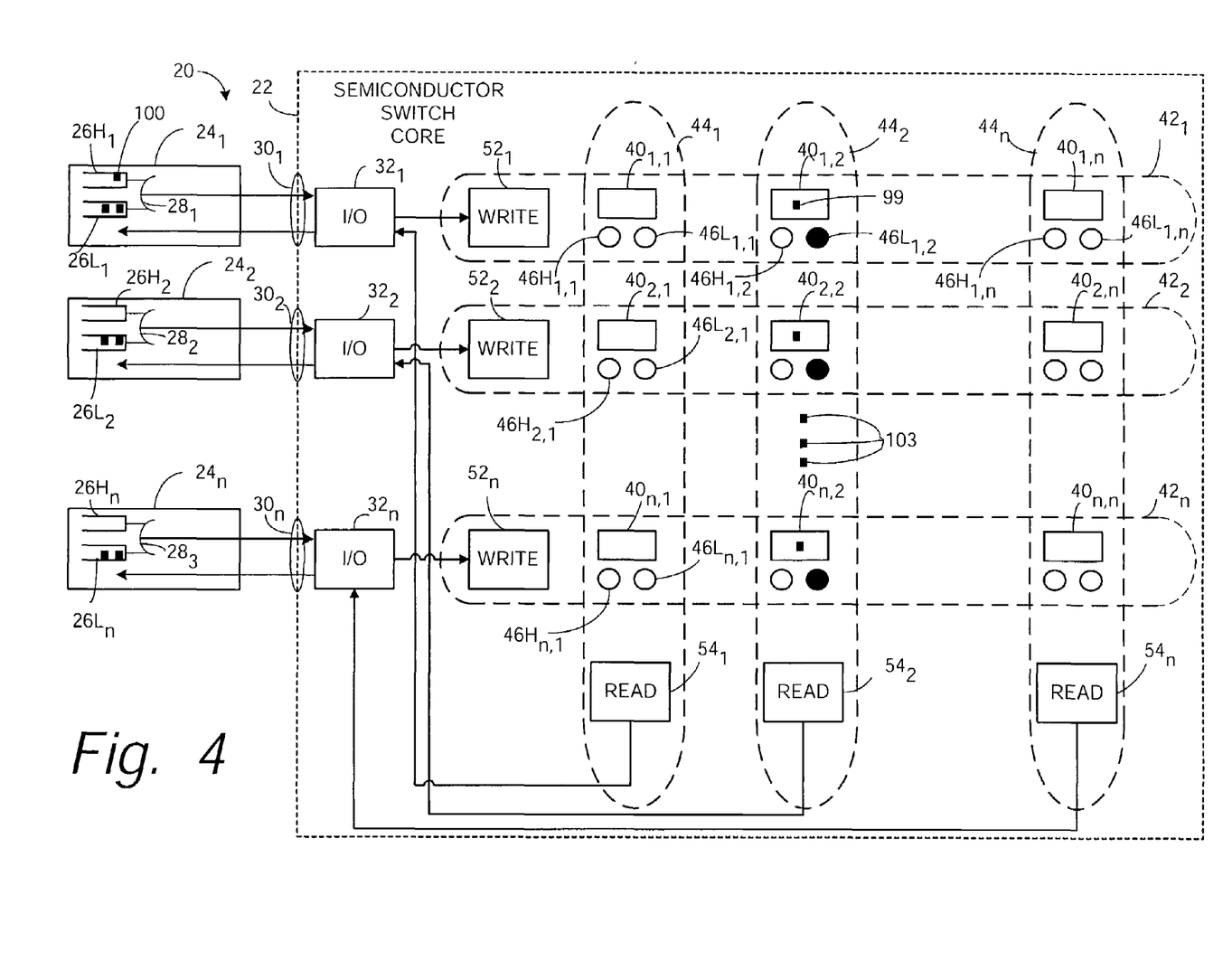

FIG. 4 shows the low priority cells as having been written into the buffer memories $40_{2,1}$ through $40_{n,1}$, for example low priority cell 99 has been written into buffer memory $40_{1,2}$. FIG. 4 further depicts the fact that other low priority cells 103 also enter column $44_2$ from switch port devices $24_3$ through $24_{n-1}$ which are not illustrated. Three such other low priority cells are shown in FIG. 4. When a low priority cell is written into a buffer memory $40_{r,c}$, its corresponding low priority signaling element $46L_{r,c}$ is activated, as indicated by the darkened circles for the low priority signaling elements $46L_{2,1}$–$46L_{n,1}$ in FIG. 4.

Figure 5:
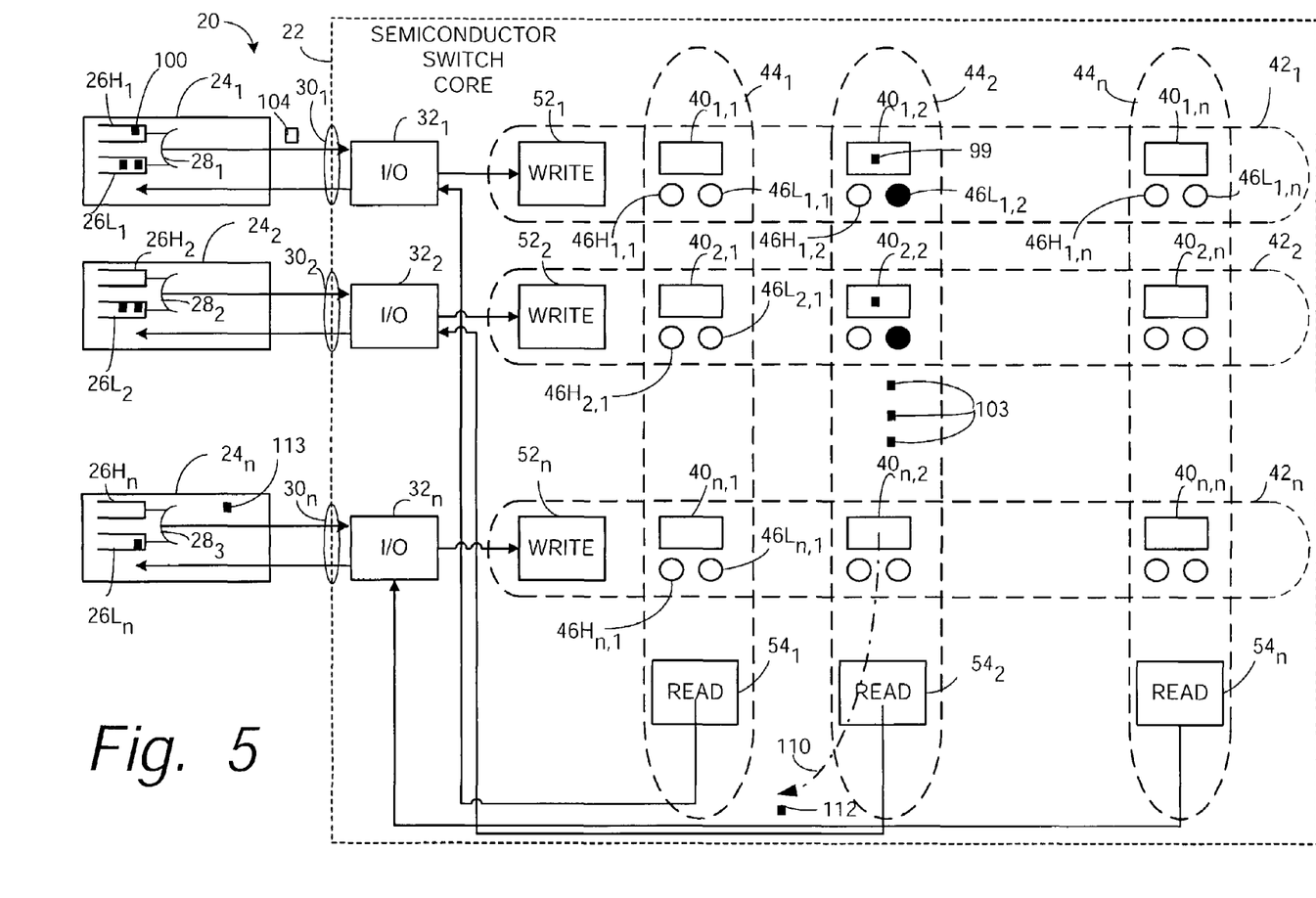

Like FIG. 4, FIG. 5 also reflects the fact that the switch port device $24_1$ has the high priority cell 100 in its high priority queue $26H_1$, but that the buffer memory $40_{1,2}$ to which high priority cell 100 is destined is occupied by low priority cell 99. Upon detecting the high priority cell 100 in its high priority queue 26H, as shown in FIG. 5 the switch port device $24_1$ sends a small control cell 104 to the I/O control logic $32_1$ of its associated switch core port $30_1$. FIG. 5 further shows by arrow 110 that read device $54_2$ has removed a low priority cell 112 from buffer memory $40_{n,2}$ in connection with a readout process. The readout of low priority cell 112 has caused switch port device $24_n$ to feed another low priority cell 113 from its low priority queue $26L_n$ toward switch core 22.

Figure 6:
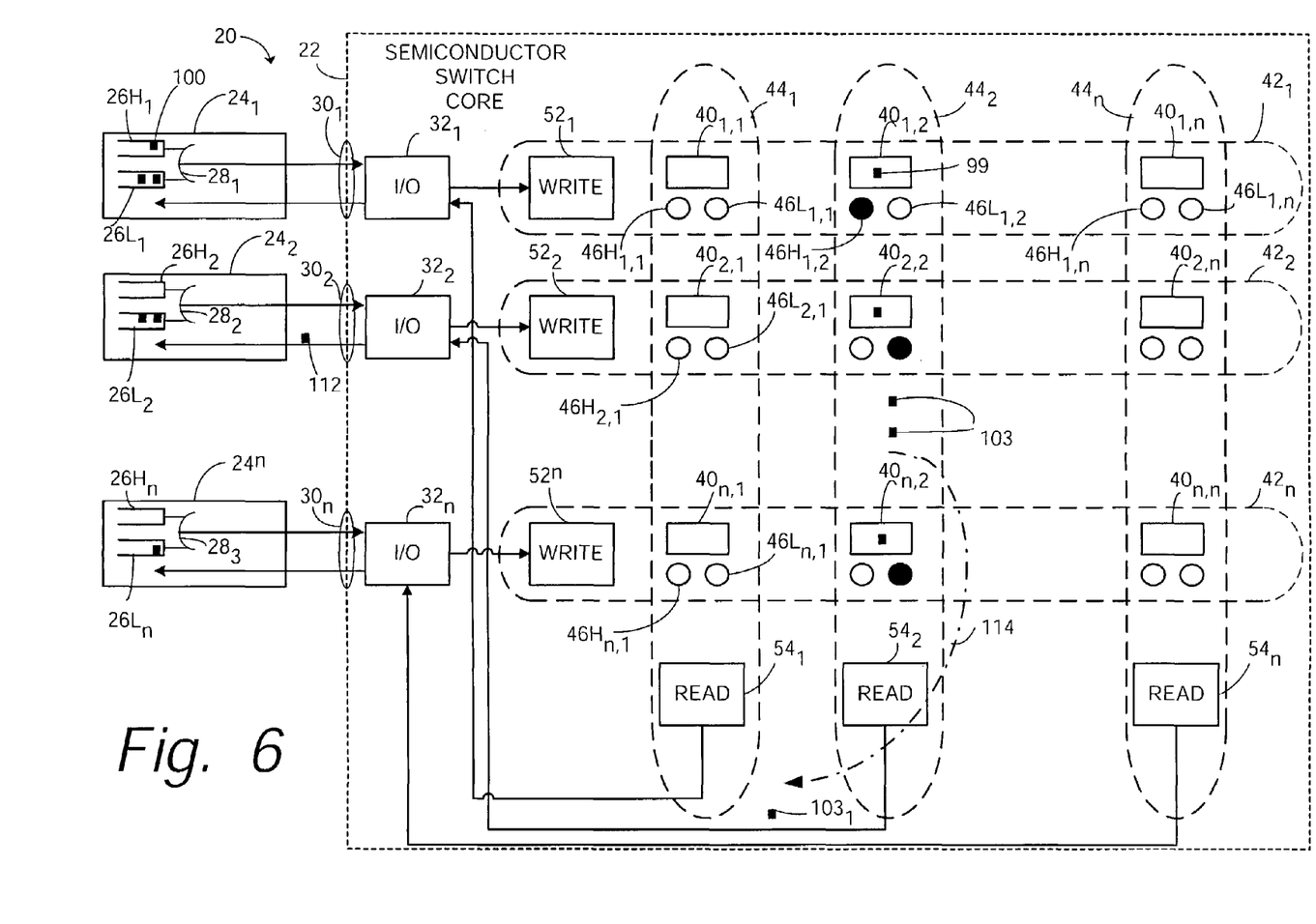

The control cell 104 sent to the I/O control logic $32_1$ as discussed above with reference to FIG. 5 causes the high priority signaling element $46H_{1,2}$ to be activated, as shown by the darkened circle of high priority signaling element $46H_{1,2}$ in FIG. 6. The activation of high priority signaling element $46H_{1,2}$ makes readout priority high for buffer memory $40_{1,2}$.

FIG. 6 also shows by arrow 114 that read device $54_2$ has removed another low priority cell 103, (this time from buffer memory $40_{2,n-1}$) in connection with the readout process. Further, one of the low priority cells from low priority queue $26L_n$ has been read into buffer memory $40_{n,2}$, and accordingly the low priority signaling element $46_{n,2}$ has been activated. The low priority cell 112 previously read out of column $44_2$ is shown on its way away from switch core 22 toward switch port device $24_2$.

Figure 7:
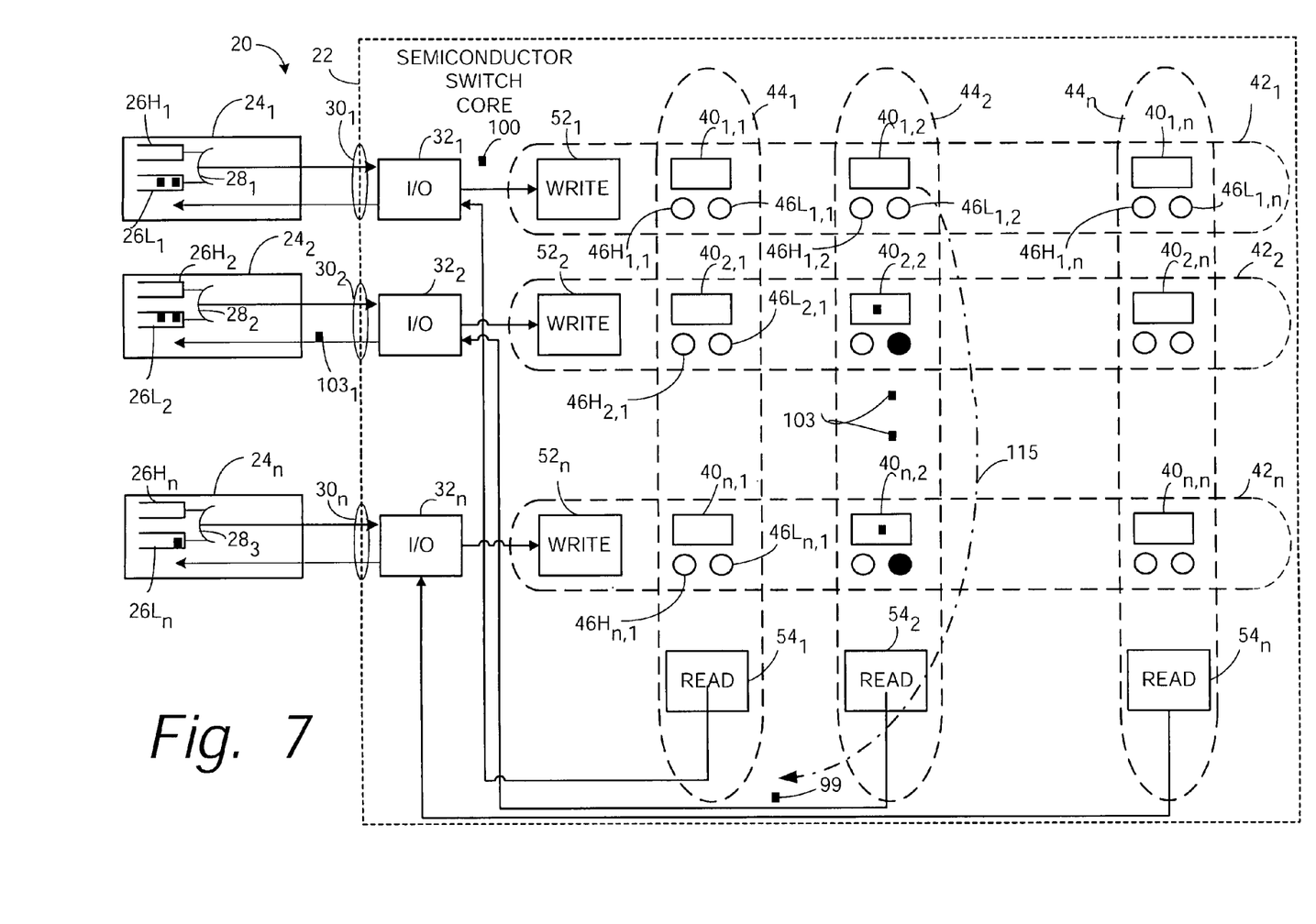

FIG. 7 indicates by arrow 115 the readout of low priority cell 99 from buffer memory $40_{1,2}$, which enables high priority cell 100 to move toward buffer memory $40_{1,2}$. But since the removal of low priority cell 99 leaves buffer memory $40_{1,2}$ temporarily vacant, the signaling elements 46 for buffer memory $40_{1,2}$ are deactivated. In addition, it can be seen in FIG. 7 that low priority cell 112 (no longer appearing in FIG. 7) has left switching node 20 via switch port device $24_2$, and that low priority cell $103_1$ last read out of column $44_2$ is on its way away from switch core 22 toward switch port device $24_2$.

Figure 8:
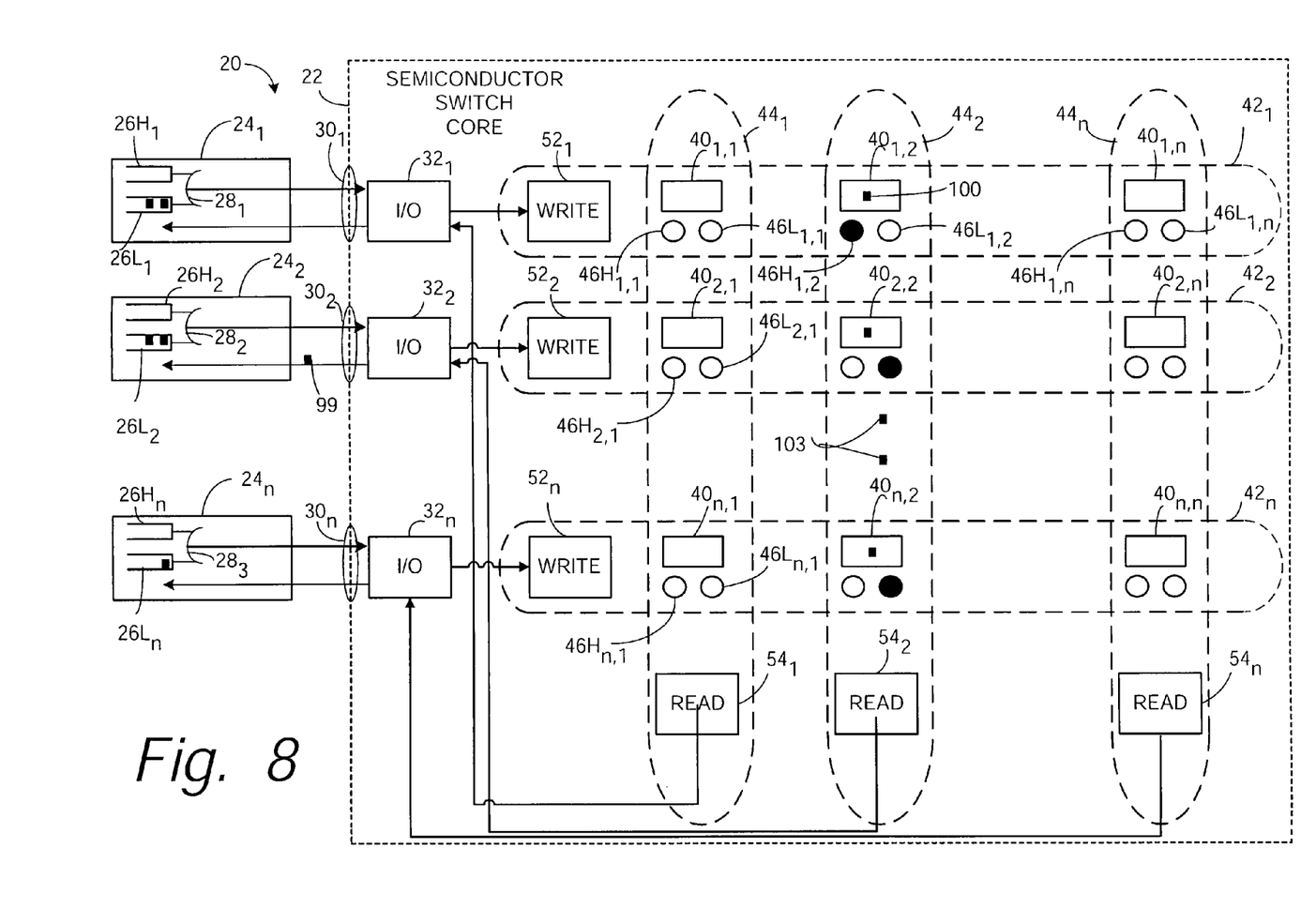

In FIG. 8 the high priority cell 100 has been written into buffer memory $40_{1,2}$. In view of such writing of high priority cell 100, the high priority signaling element $46H_{1,2}$ is activated as shown by the darkened circle in FIG. 8. FIG. 8 further shows that the low priority cell $103_1$ (no longer appearing in FIG. 8) has left switching node 20 via switch port device $24_2$, and that low priority cell 99 last read out of column $44_2$ is on its way away from switch core 22 toward switch port device $24_2$.

Thus, the low priority cell 99 which had previously constituted a temporary block in buffer memory $40_{1,2}$ with respect to approaching high priority cell 100 has been quickly removed by the low priority cell flushing operation of the present invention. Moreover, the low priority cell 99 has been routed toward its desired destination. Significantly, low priority cell 99 was not merely discarded for the sake of expediting routing of high priority cell 100, but was routed appropriately. Thus, the low priority cell flushing operation of the present invention avoids cell/packet discard on a packet level of protocol. This is important because discard often invokes a retransmission of the discarded cell or packet. Often the discarded cell or packet forms part of a much larger transmission unit, so that the entire larger transmission unit must be retransmitted. In either retransmission scenario there is an undesirable further congestion of the overall system.

Figure 9:
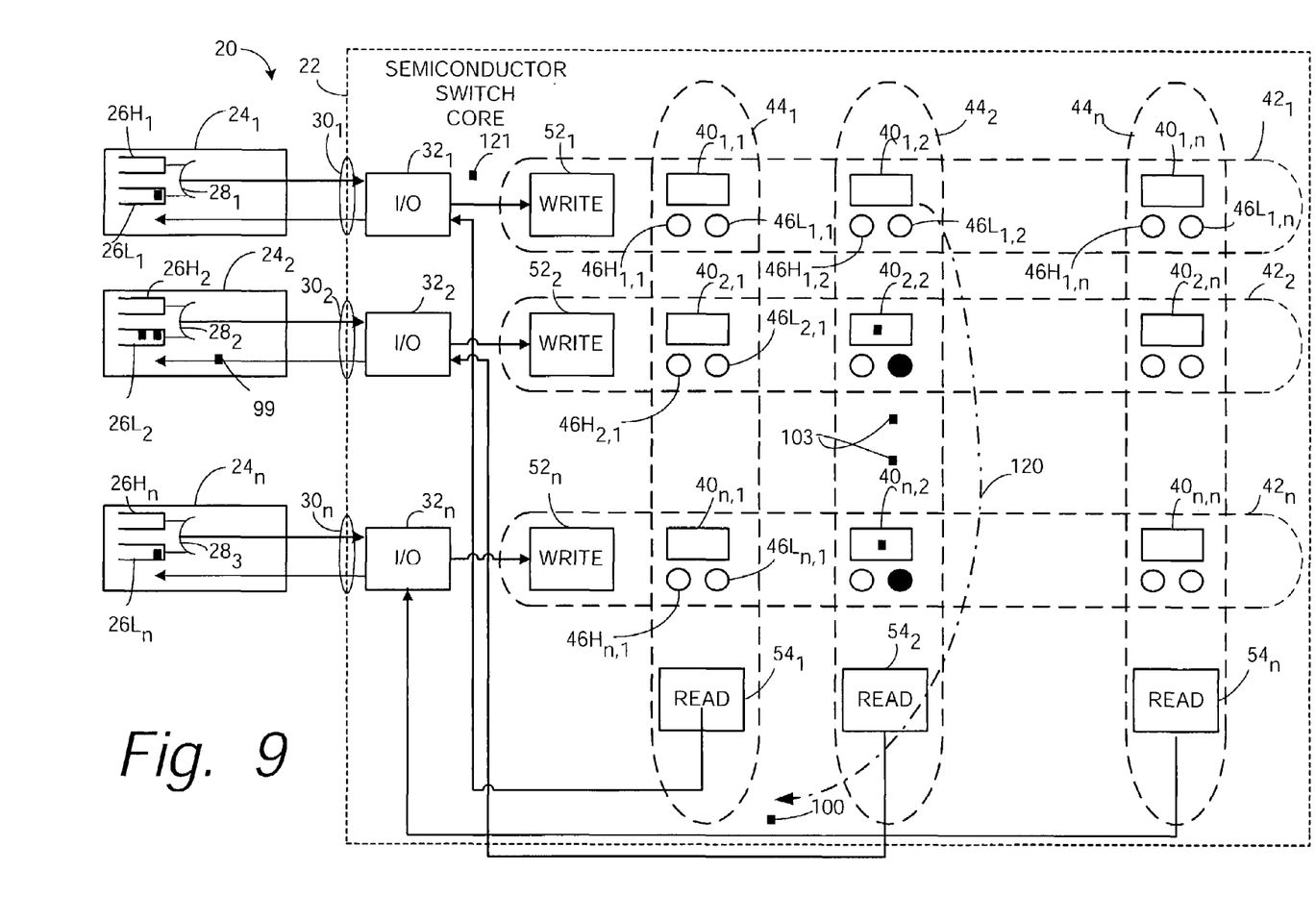

FIG. 9 depicts by arrow 120 the removal of high priority cell 100 from buffer memory $40_{1,2}$. Since high priority cell 100 is read out from buffer memory $40_{1,2}$, the high priority signaling element $46H_{1,2}$ is deactivated (reflected by the clearing of the circle for high priority signaling element $46H_{1,2}$ in FIG. 9). Since buffer memory $40_{1,2}$ is now vacant, another low priority cell 121 can be sent from switch port device $24_1$ toward buffer memory $40_{1,2}$.

Figure 10:
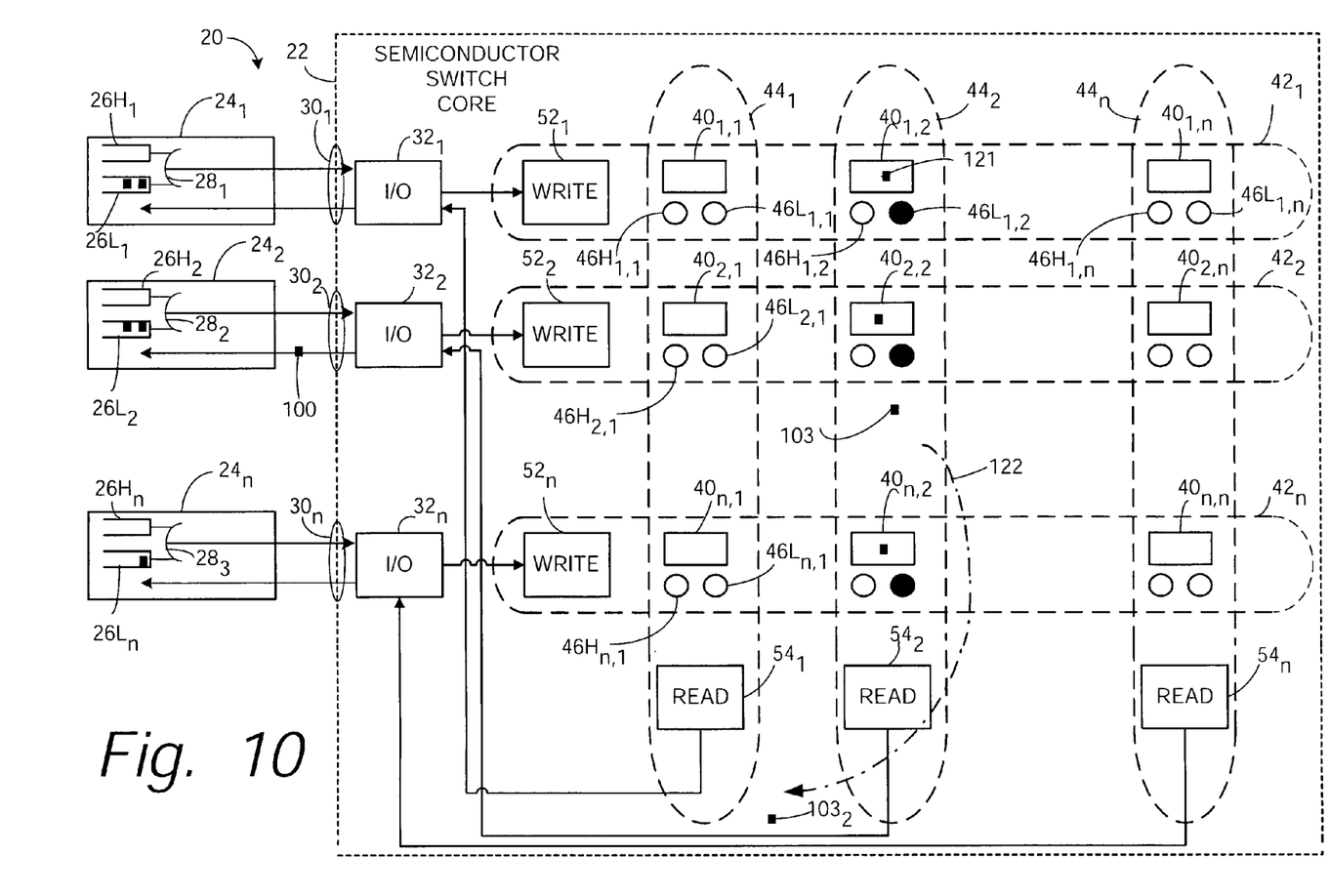

FIG. 10 shows high priority cell 100 on its way from switch core 22 to switch port device $24_2$, and the read out procedure returning to a scheme of handling low priority cells. For example, the low priority cell 121 has been written into buffer memory $40_{1,2}$, and the corresponding low priority signaling element $46L_{1,2}$ has been activated. In addition, the read device $54_2$ has read out another low priority cell (cell $103_2$) from column $44_2$ as represented by arrow 122.

As understood from the foregoing, the present invention with its low priority cell flushing operation facilitates transfer of cells having different priority classes (e.g., quality of service [QoS] classes) through a single (e.g., two dimensional) buffer matrix. Usage of the signaling elements 46 formed as memory elements in the semiconductor switch core 22 enables the egress server (e.g., read devices 54) to act on the priority signal and thereby function using only a two dimensional buffer matrix. Therefore, there need not a third dimension of the switch core having a third dimension matrix for each priority class. Advantageously, the size of the silicon area required for the semiconductor switch core 22 is reduced. This enables fabrication of a smaller switch core, or a larger switch core using the same or lesser amount of silicon area as would be required by a conventional switch core.

It will be appreciated that more complex functions can be utilized with the semiconductor switch core and low priority cell flushing operation of the present invention, such as (for example) complex functions such as point to multi-point connections.

Advantageously, with the present invention and its only two dimensional matrix buffer, error checking operations and cell transfer operations are simplified, particularly in embodiments which have a redundant switch core.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A semiconductor switch core comprising:
    a buffer matrix having one buffer memory per crosspoint to which cells having differing priority classes are written;
    a high priority signaling element associated with a corresponding crosspoint, the high priority signaling element when active indicating that a high priority cell is in a queue awaiting writing to the buffer memory for its corresponding crosspoint;
    input/output topic for reading out any low priority cell that resides in the buffer memory for the corresponding crosspoint when the high priority signaling element is active
    wherein the semiconductor switch core has a plurality of ports, and wherein the low priority cell read out from the buffer memory for the corresponding crosspoint when the high priority signaling element is active is applied to a port of the switch for transmission out of the switch.

2. The apparatus of claim 1, wherein the high priority signaling element is also active when the high priority cell is in the buffer memory for the corresponding crosspoint.

3. A semiconductor switch core comprising:
    a buffer matrix having one buffer memory per crosspoint to which cells having differing priority classes are written;
    a high priority signaling element associated with a corresponding crosspoint, the high priority signaling element when active indicating that a high priority cell is in a queue awaiting writing to the buffer memory for its corresponding crosspoint;
    input/output logic for reading out any low priority cell that resides in the buffer memory for the corresponding crosspoint when the high priority signaling element is active
    a low priority signaling element associated with a corresponding crosspoint, the low priority signaling element when active indicating that a low priority cell is in the buffer memory for the corresponding crosspoint so long as no high priority cell is in the queue awaiting writing to the buffer memory for the corresponding crosspoint.

4. The apparatus of claim 3, wherein the high priority signaling element is also active when the high priority cell is in the buffer memory for the corresponding crosspoint.

5. The apparatus of claim 1, wherein the buffer matrix has only one buffer memory per crosspoint.

6. The apparatus of claim 3, wherein the buffer matrix has only one buffer memory per crosspoint.

7. A semiconductor switch core comprising:
    a buffer matrix having one buffer memory per crosspoint to which cells having differing priority classes are written;
    a high priority signaling element associated with a corresponding crosspoint, the high priority signaling element when active indicating that a high priority cell is in a queue awaiting writing to the buffer memory for its corresponding crosspoint;
    input/output logic for reading out any low priority cell that resides in the buffer memory for the corresponding crosspoint when the high priority signaling element is active wherein the high priority signaling element is also active when the high priority cell is in the buffer memory for the corresponding crosspoint, wherein the high priority signaling element is a semiconductor memory element.

8. The apparatus of claim 7, wherein the buffer matrix has only one buffer memory per crosspoint.

9. A switching node of a telecommunications system comprising:
a semiconductor switch core comprising:
a buffer matrix having one buffer memory per crosspoint to which cells having differing priority classes are written;
plural switch core ports, each of the switch core ports writing cells to a row of the matrix and reading cells from a column of the matrix;
a high priority signaling element associated with a corresponding crosspoint;
plural switch port devices connected to corresponding ones of the plural switch core ports, an appropriate one of the switch port devices comprising a queue for low priority cells awaiting writing to the corresponding crosspoint and a queue for high priority cells awaiting writing to the corresponding crosspoint; and
wherein the high priority signaling element when active indicates that a high priority cell is in the queue for high priority cells awaiting writing to the buffer memory for its corresponding crosspoint, and wherein an appropriate one of the switch core ports reads out any low priority cell that resides in the buffer memory for the corresponding crosspoint when the high priority signaling element is active.

10. The apparatus of claim 9, wherein the high priority signaling element is also active when the high priority cell is in the buffer memory for the corresponding crosspoint.

11. The apparatus of claim 9, wherein the buffer matrix has only one buffer memory per crosspoint.

12. The apparatus of claim 9, wherein the low priority cell read out from the buffer memory for the corresponding crosspoint when the high priority signaling element is active is applied to the appropriate one of the switch core ports for transmission out of the switch.

13. The apparatus of claim 9, further comprising a low priority signaling element associated with a corresponding crosspoint, the low priority signaling element when active indicating that a low priority cell is in the buffer memory for the corresponding crosspoint so long as no high priority cell is in the high priority queue awaiting writing to the buffer memory for the corresponding crosspoint.

14. The apparatus of claim 9, wherein the high priority signaling element is a semiconductor memory element.

15. A method of operating a semiconductor switch core, the semiconductor switch core comprising a buffer matrix having one buffer memory per crosspoint, a high priority signaling element associated with a corresponding crosspoint; and an input/output logic for reading out cells from the corresponding crosspoint; wherein the method comprises:
writing a low priority cell to the buffer memory for the corresponding crosspoint;
activating the high priority signaling element when a high priority cell is in a queue awaiting writing to the buffer memory for the corresponding crosspoint;
reading out the low priority cell from the buffer memory for the corresponding crosspoint when the high priority signaling element is active,
writing the high priority cell to the buffer memory for the corresponding crosspoint after the low priority cell has been read out.

16. A method of operating a semiconductor switch core, the semiconductor switch core comprising a buffer matrix having one buffer memory per crosspoint, a high priority signaling element associated with a corresponding crosspoint; and an input/output logic for reading out cells from the corresponding crosspoint; wherein the method comprises:
writing a low priority cell to the buffer memory for the corresponding crosspoint:
activating the high priority signaling element when a high priority cell is in a queue awaiting writing to the buffer memory for the corresponding crosspoint;
reading out the low priority cell from the buffer memory for the corresponding crosspoint when the high priority signaling element is active,
activating the high priority signaling element also when the high priority cell is in the buffer memory for the corresponding crosspoint.

17. The method of claim 16, further comprising activating a low priority signaling element when a low priority cell is in the buffer memory for the corresponding crosspoint so long as no high priority cell is in the queue awaiting writing to the buffer memory for the corresponding crosspoint.

18. The method of claim 16, wherein the step of activating the high priority signaling element involves writing a predetermined value to a semiconductor memory element comprising the switch core.

19. A method of operating a semiconductor switching node, the semiconductor switch core comprising a semiconductor switch core and plural switch port devices, the semiconductor switch core comprising a buffer matrix having one buffer memory per crosspoint, plural switch core ports, and a high priority signaling element associated with a corresponding crosspoint, the plural switch port devices being connected to corresponding ones of the plural switch core ports, the method comprising:
in an appropriate one of the switch port devices, queuing in a queue for low priority cells a low priority cell awaiting writing to the corresponding crosspoint;
writing the low priority cell to the buffer memory for the corresponding crosspoint;
in the appropriate one of the switch port devices, queuing in a queue for high priority cells a high priority cell awaiting writing to the corresponding crosspoint;
activating the high priority signaling element when the high priority cell is queued in queue for high priority cells;
reading out the low priority cell from the buffer memory for the corresponding crosspoint when the high priority signaling element is activated.

20. The method of claim 19, further comprising writing the high priority cell to the buffer memory for the corresponding crosspoint after the low priority cell has been read out.

21. The method of claim 19, further comprising activating the high priority signaling element also when the high priority cell is in the buffer memory for the corresponding crosspoint.

22. The method of claim 19, further comprising activating a low priority signaling element when a low priority cell is in the buffer memory for the corresponding crosspoint so long as no high priority cell is in a queue awaiting writing to the buffer memory for the corresponding crosspoint.

23. The method of claim 19, wherein the step of activating the high priority signaling element involves writing a predetermined value to a semiconductor memory element comprising the switch core.

24. A method of operating a semiconductor switching node, the semiconductor switch core comprising a semiconductor switch core and plural switch port devices, the semiconductor switch core comprising a buffer matrix having one buffer memory per crosspoint, plural switch core ports, the plural switch port devices being connected to corresponding ones of the plural switch core ports, the method comprising:

in an appropriate one of the switch port devices, queuing in a queue for low priority cells a low priority cell awaiting writing to the corresponding crosspoint;

writing the low priority cell to the buffer memory for the corresponding crosspoint;

in the appropriate one of the switch port devices, queuing in a queue for high priority cells a high priority cell awaiting writing to the corresponding crosspoint;

providing an indication that the high priority cell awaiting writing to the corresponding crosspoint is in the queue for high priority cells;

reading out the low priority cell from the buffer memory for the corresponding crosspoint in response to the indication.

25. The method of claim 24, further comprising writing the high priority cell to the buffer memory for the corresponding crosspoint after the low priority cell has been read out.

\* \* \* \* \*